Figure 2:
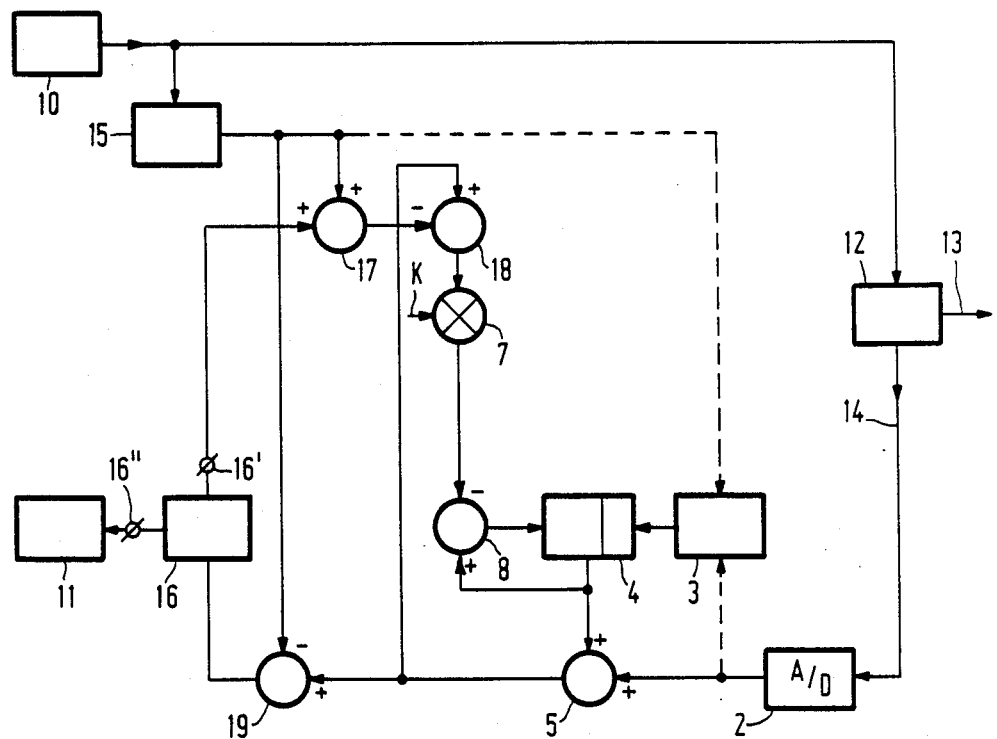

United States Patent [19]
Tol et al.

[11] Patent Number: 4,746,902
[45] Date of Patent: May 24, 1988

[54] ARRANGEMENT FOR COMPENSATING FOR NON-LINEAR DISTORTION IN AN INPUT SIGNAL TO BE DIGITIZED AND AN ECHO CANCELLING SYSTEM COMPRISING SUCH A ARRANGEMENT

[75] Inventors: Simon J. M. Tol; Kornelis J. Wouda, both of Eindhoven, Netherlands

[73] Assignees: AT&T, Berkely Heights, N.J.; Philips Telecommunications B. V., Hilversum, Netherlands

[21] Appl. No.: 28,641

[22] Filed: Mar. 20, 1987

[30] Foreign Application Priority Data

Mar. 28, 1986 [NL] Netherlands ............... 8600815

[51] Int. Cl.$^4$ .................................................. H03M 1/06
[52] U.S. Cl. .............................. 340/347 CC; 370/32.1
[58] Field of Search ........................ 370/32, 32.1; 340/347 CC

[56] References Cited

U.S. PATENT DOCUMENTS 4,527,020 7/1985 Ito ................................. 370/32.1
4,612,533 9/1986 Evans ..................... 340/347 CC Primary Examiner—Charles D. Miller
Attorney, Agent, or Firm—Lucian C. Canepa

[57] ABSTRACT

An arrangement for compensating for non-linear distortion in an input signal to be digitized, comprising an analogue-to-digital converter (2) for converting the input signal into an amplitude-time discrete output signal, means (3) for deriving a set of coefficients which are associated with an orthogonal signal representation of a signal related to the input signal, a memory (4) in which a Table with correction values is stored, means for addressing the memory for reading a correction value from the Table, each of the coefficients determining an address for the memory, means (5) for adding together the correction value and the analogue-to-digital converter output signal for providing a linearized signal, and an adaptive control loop (7,8,16,18) for substituting in the Table the new correction value for the correction value read.

12 Claims, 2 Drawing Sheets

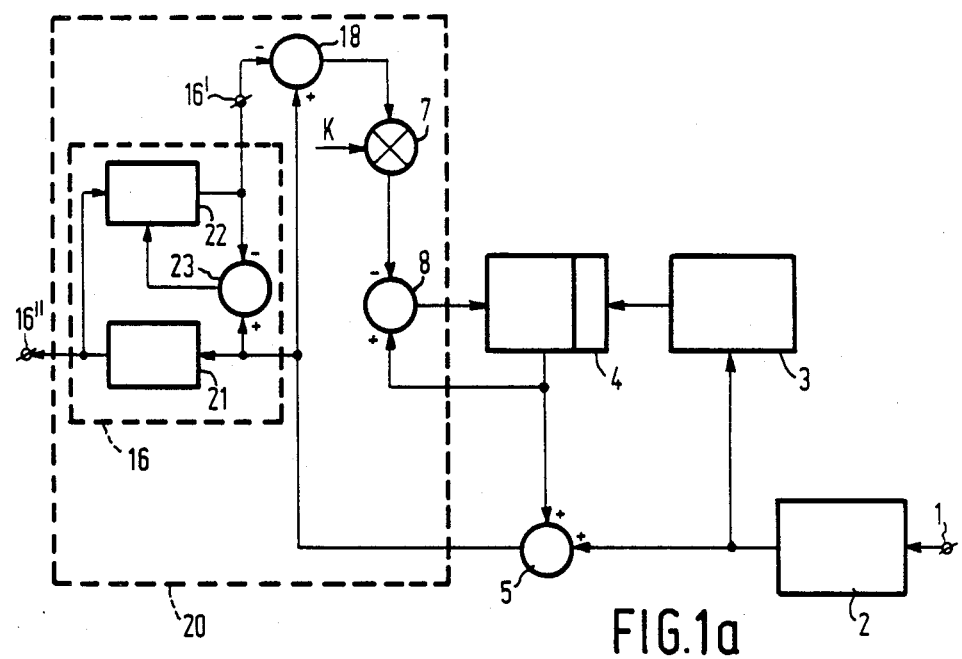
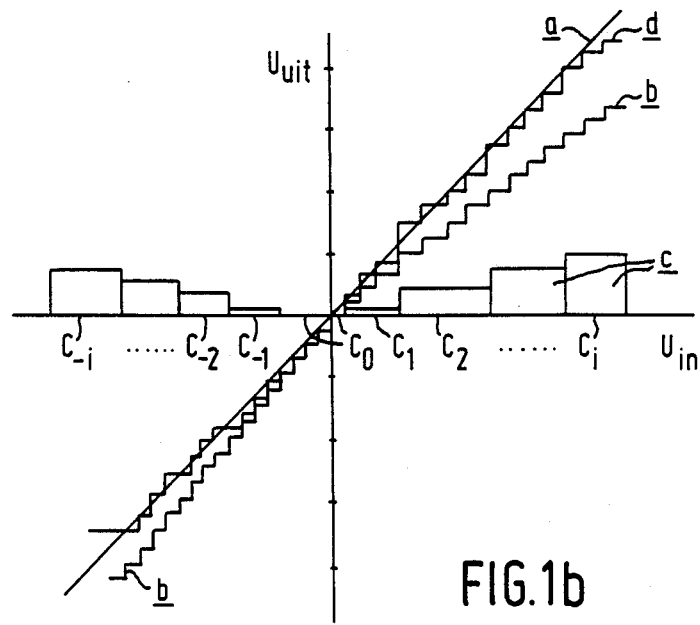

ARRANGEMENT FOR COMPENSATING FOR NON-LINEAR DISTORTION IN AN INPUT SIGNAL TO BE DIGITIZED AND AN ECHO CANCELLING SYSTEM COMPRISING SUCH A ARRANGEMENT

The invention relates to an arrangement for compensating for non-linear distortion in an input signal to be digitized, comprising an analogue-to-digital converter for converting the input signal into an amplitude-time discrete output signal and to an echo cancelling system comprising such an arrangement.

The article by O. Agazzi, D. A. Hodges and D. G. Messerschmidt: "Large-Scale Integration of Hybrid-Method Digital Subscriber Loops" in I.E.E.E. Transaction on Communications, Vol. COM-30, No. 9, September 1982, pages 2095–2108 describes such an arrangement for use in an echo canceller. This article also enumerates the problems which may occur due to non-linear distortion.

Upon digital processing of a signal applied in analogue form, the non-linear transmission in the different stages of the analogue transmission circuit and also the non-linearity of the analogue-to-digital converter (denoted A/D converter in the sequal) may prevent a linear conversion of the applied analogue signal into a digital signal.

So far efforts have been made to minimize the non-linearity in the analogue signal path and in the A/D converter by utilizing electronic circuits having a lowest possible non-linear distortion. This entails high costs for these circuits, whilst in many cases the linearity in the signal transmission is still not optimal.

In said article from I.E.E.E.-COM it is remarked that upon full digital processing of an applied analogue signal compensating for the non-linear distortion in that signal results in particularly inpractible solutions, so that the article comes to the conclusion that the fully digital processing of the applied signal is undesirable.

The invention has for its object to provide a solution of the above-mentioned problem, which is practically feasible and in which a very good linearity can be obtained at, in addition, comparatively low cost.

To that end the invention provides an arrangement of the above-mentioned type, wherein there are provided means for deriving a set of coefficients associated with an orthogonal signal representation of a signal which is related to the input signal, a memory in which a Table of correction values can be stored, means for addressing the memory for reading a correction value from the Table, each coefficient determining an address for the memory, means for summing the correction values read and the output signal of the analogue-to-digital converter for providing a linearized signal, and an adaptive control loop having means for determining a linear approximation of the input signal, means arranged for determining the difference between the linearized signal and the signal which is a representation of the linear approximation of the input signal, means for determining a new correction value from this difference and the correction value read and means for substituting in the Table the new correction value for the correction value read.

The invention more specifically relates to an echo cancelling system comprising an arrangement according to the invention. On digital transmission in two directions via a two-wire link the use of an echo canceller is imperative, since the signal at the input of a receiver for such a two-wire link contains a strong echo component in response to the own transmit signal of the transmitter associated with the receiver. By now reducing the received signal by a signal which is the best possible approximation of the fraction of the signal transmitted by its own transmitter, the what is commonly referred to as the echo signal, present in the received signal, it is possible to derive the actually received signal from the received signal, inspite of the strong echo component contained therein. In such echo cancellers use can be made of a filter which is capable of compensating for any linear combination of transmitted preceding symbols, a what is commonly referred to as a transversal filter. This manner of echo cancellation is extensively described in N. A. M. Verhoechx et al: "Digital echo cancellation for baseband data transmission" I.E.E.E. Transactions ASSP, Volume ASSP-27, No. 6, December 1979, pages 768–781. A non-linear transmission characteristic in the signal path between the transmitter and the receiver can however not be compensated for by the transversal filter and produces residual errors of such a value that an adequate echo cancellation is not possible.

In U.S. Pat. No. 4,237,463 an echo cancellation system with an adaptive control loop has already been proposed, use being made of a memory in which a Table is stored having a specific compensation value in the Table for any possible combination of symbols transmitted during a predetermined, previous period of time. However, such a system has the disadvantage that the adaptive control requires a significantly longer time to obtain a good compensation value then when a transversal filter is used, because any random value in the Table is read only at a very low rate and is then only corrected via the adaptive control loop. The echo cancelling system according to the invention also provides a solution for this problem, in that an arrangement according to the invention is provided, by means of which the non-linearity in the digital system subjected to echo cancellation is already effectively compensated for prior to this echo cancellation, so that the actual echo cancellation is performed on the signal without non-linear distortion, it then being possible to use advantageously a transversal filter comprising an adaptive control loop for this echo cancellation.

In addition, said Patent Specification relates to an echo canceller in which an analogue signal is supplied and in which also here an analogue echo cancellation signal is used, so that an A/D converter and an D/A converter are required with the errors and costs inherent thereto.

The invention and how it can be put into effect will now be described in greater detail by way of example with reference to embodiments shown in the accompanying drawings. Herein:

FIG. 1a is a block circuit diagram of a circuit according to the invention for compensating for non-linear distortion, FIG. 1b shows a representation of a possible manner of compensating for non-linear distortion using the circuit of FIG. 1a and, FIG. 2 shows an echo cancellation system according to the invention.

An analogue signal whose origin is not important, at least for the time being, for the description of the invention, is applied to the input terminal denoted by reference numeral 1 in FIG. 1. When the analogue signal at terminal 1 does not yet have a non-linear distortion component, these components will be introduced without fail in the A/D converter 2 to which the signal is applied. The amplitude and time-discrete output signal of the A/D converter has non-linear distortion relative to the signal which should be present in the ideal case, that is to say without non-linear distortion. To compensate for this non-linearity, a set of coefficients which are associated with an orthogonal signal representation of a signal related to the analogue signal at terminal 1 is derived from the output signal of the A/D converter 2 according to the invention. In the embodiment the signal related to the analogue signal at terminal 1 is the output signal of the A/D converter and this signal is applied to a quantization circuit 3 with the object of deriving the set of coefficients. In quantization circuit 3 the signal is distributed in a customary manner into a plurality of segments, consecutive segments representing consecutive amplitude value ranges and each segment constituting in an unambiguous manner an address for a Table stored in a memory 4, for example a RAM. This Table contains a compensation value for each segment. After addressing of the Table by quantization circuit 3, the address compensation value is applied to an adder circuit 5 which adds together the output signal of the A/D converter 2 and the compensation signal. The signal supplied from the output of the adder circuit 5 thus has considerably less non-linear distortion than the output signal of the A/D converter.

The manner in which the compensation is effected, will now be explained with reference to FIG. 1b. In this Figure a non-distorted input signal $U_{in}$ is shown on the horizontal axis and the output signal $U_{of}$ of the A/D converter 2 is plotted along the vertical axis. Without non-linear distortion the relation between $U_{in}$ and $U_{out}$ would be linear, as is schematically shown by means of characteristic a. Due to the non-linear distortion the relation between $U_{in}$ and $U_{out}$ is however, for example, as indicated by characteristic b. In the Table in memory 4 a correction value is now stored for each segment, that is to say for each range of amplitude values of $U_{in}$, which correction values are illustrated in FIG. 1b by the height of the blocks c. While now adding the associated correction value to each amplitude section of $U_{in}$, a characteristic is obtained as illustrated in FIG. 1b by d. This characteristic has a considerably better linearity than characteristic b. It will be obvious that, depending on the quantization degree of the signal $U_{in}$, more or less different compensation values are stored in the Table and the approximation of the linearity will be better or poorer. However, a high degree of quantization requires much storage room and, as will be explained hereinafter, provides a slow adaptive procedure. One of the advantages of the circuit according to the invention is precisely the fact that the Table in the memory 4 needs to contain only comparatively few values, since also with a lower degree of quantization a remarkable improvement in the linearity is already obtained.

It will be obvious that more methods are possible for linearizing the characteristic b of FIG. 1b by means of correction values. Thus, the characteristic b can, for example, be represented by means of any set of coefficients associated with an orthogonal signal representation of a signal related to the input signal, having its own correction value in the Table for each coefficient.

There are different possibilities to determine the correction value suitable for the characteristic b in the Table.

The most obvious and well-known manner is to measure already beforehand the deviation of characteristic b from the linear characteristic a and to determine correction values on the bases thereof. Such a manner of correction is however static, so that variations in the deviation of characteristic b relative to the linear characteristic are not compensated for.

A different solution is an adaptive control, the correction values in the Table being continuously optimized and the correction values in the Table being set via a control loop during a "training period". However, such a procedure has the disadvantage that for a proper operation the training period must periodically be repeated, which implies that the system is not continuously available for transmitting and receiving signals.

According to the invention, use is made of an adaptive control, the normally available signal being utilized for readjusting the correction values in the Table, so that the system is now indeed continuously available.

Consequently, the circuit shown in FIG. 1a includes an adaptive control loop, which is generally denoted by reference numeral 20, comprising a multiplier 7, subtracting circuits 8 and 18 and a circuit which generally is denoted by reference numeral 16. Circuit 16 comprises a detector 21, a transversal filter 22 whose coefficients can be adaptively readjusted, and a subtracting circuit 23. The detector 21 receives the output signal from subtracting circuit 5 and from the output terminal 16" of the circuit 16 supplies the symbols detected in the output signal of circuit 5. The output signal of detector 21 is also coupled to an input of the transversal filter 22, whose output produces at the output terminal 16' of circuit 16 a signal which is a linear estimation of the output signal of circuit 5, which estimation is effected with the aid of the symbols detected by the detector 21, and on the basis of the coefficients of the transversal filter 22. For adaptively readjusting the coefficients of the transversal filter 22 an adaptive control loop including the subtracting circuit 23 is provided. This subtracting circuit determines the difference between the output signal of circuit 5 and the transversal filter output signal and produces at its output a correction signal for correcting the coefficients of the transversal filter 22, which correction signal is applied to a second input terminal of filter 22. Subtracting circuit 18 determines the difference between the signal supplied by adder circuit 5 and the output signal of circuit 16 at terminal 16'. The output signal of subtracting circuit 18 is coupled to the multiplier 7, in which the signal is multiplied by a previously determined control constant k. In the subtracting circuit 8 the actually used Table value is reduced by the deviation determined by multiplier 7 via the control loop 20 and this new Table value is entered into the memory 4 to replace the old Table value.

In the adaptive control according to the invention, the analogue signal applied to terminal 1 must satisfy one specific condition: it must consists of a linear combination of sound signals, which combination must be derivable from either the signal itself, or from an other source. If this condition is not satisfied, it is not possible to determine at the output of the A/D converter whether non-linear distortion of the input has occurred or not occurred. A signal satisfying said condition is, for example, an analogue signal present at the input of the receiver of a digital transmission signal. The signal can be formed from a digital three-level transmit signal which, because of distortion and transmission line properties can be distorted such on reception that it might be considered as an analogue signal. From this signal it is however indeed always known that it must result from a signal having only three levels. For an optimum operation of the circuit shown in FIG. 1 having an adaptive control loop, a few measures must however still be taken. In the first place a problem may arise in that the adaptive control signal assumes a permanently incorrect setting when the linear reconstruction of the received signal evidences a linear error. The total overal signal can then, for example, be indeed linear but it can, for example, be 10% too small over the total overall amplitude range. The adaptive control loop will then try to compensate for also a linear portion in the adaptive signal and consequently preserve the 10% linear error. In the second place a problem may arise when the received signal at the input of the A/D converter is not uniformly distributed. Certain values in the Table are then read less often or even not read at all and consequently they are not adaptively readjusted.

For both problems a solution has been found, all Table values regularly being corrected by coupling adjacent values in the Table. This can, for example, be effected by adjusting, using a cyclic procedure, every value in the Table, the value adjacent to the origin excepted, to the value of the adjacent Table value taken in the direction of an origin. This prevents the situation that given values are seldom or never corrected and, in addition, a linear error in the reconstructed curve is cancelled by controlling to the origin.

The procedure of correcting the Table value can be represented by the following formula:

$$C_i{'}=C_i+K_s(C_{i-1}-C_i) \text{ for } i=1 \text{ or } N(1)$$

$$C_i{'}=C_i+K_s(C_{i+1}-C_i) \text{ for } i=-1 \text{ to } -N(2)$$

$$C_0{'}=C_0-K_sC_0$$

wherein $C_i(i=-N$ to $N)$ are the $2N+1$ correction values stored in the Table in memory 4, for example correction values such as they are illustrated in FIG. 1b by the height of the blocks $C_{-N}-C_N$; $C_o$ being the coefficient around the origin. Furthermore, $K_s$ in formula (1)–(3) is a smoothing constant.

FIG. 2 shows an echo cancellation system according to the invention.

The system shown in FIG. 2 comprises a transmitter 10, a receiver 11 and a hybrid circuit 12, via which digital transmission through a two-wire line 13 can be effected. Because of the non-ideal properties of the hybrid circuit 12 and the comparatively high cable attenuation on line 13, the signal received on line 14 will comprise a significant echo component of its own transmitter 10 and only a comparatively weak signal received from a different transmitter 10', not shown. In order to enable separation of the actually desired, received signal from the signal on line 14, which consists of the last-mentioned signal and the echo signal, an echo canceller 15 has been provided in known manner. This echo canceller 15 is of a known type and preferably includes a transversal filter, so that a linear estimation of the echo component is available at the output of echo canceller 15.

As is obvious from FIG. 2, a circuit which fundamentally is identical to the circuit already shown in FIG. 1a, is included between the hybrid circuit 12 on the one hand and the receiver 11 and the echo canceller 15 on the other hand. Identical components in FIGS. 1a and 2 are consequently given the same reference numerals. In addition, the system shown in FIG. 2 includes a summing circuit 17 and a subtracting circuit 19.

The signal at the output terminal 16' of circuit 16, which is a linear estimation of the overal received signal, is added in summing circuit 17 to the output signal of echo canceller 15, so that the output signal of summing circuit 17, which is coupled to a subtracting circuit 18, is the sum of the linear estimation of the total overall received signal and the linear estimation of the echo component and, consequently, a linear estimation of the signal on line 14.

In the subtracting circuit 18 the output signal of summing circuit 5, which is the output signal of the A/D converter 2 corrected by the Table values and used for compensating non-linear distortion, is reduced by the linear estimation of the total received signal inclusive of the echo signal, so that at the output terminal of circuit 18 a signal is present which is suitable for readjusting the values in memory 4, in the manner as described with reference to FIG. 1a.

The subtracting circuit 19 has one end coupled to the entire received signal inclusive of the echo signal, in which signal the non-linear distortion has been compensated for in accordance with the invention by means of the arrangement shown in FIG. 1a, and its other side to the linear estimation of the echo signal, determined by circuit 15. By subtracting these signals from each other, the output of circuit 19 supplies a signal which is suitable for making a linear estimation, in circuit 16, of the actually received signal and for detecting the received symbols, which detection actually is the ultimate object of the system. The detected, received symbols are supplied from an output terminal 16" of circuit 16 and are applied to the receiver 11.

As the amplitude of the signal at the output of the A/D converter 2, and consequently its degree of excitation, is predominantly determined by the echo signal, it is possible, in accordance with a variation of the invention, not to quantize the output signal of the D/A converter 2, but to use the digital output signal of the echo canceller 15, via the connection shown by means of a doted line, for directly driving quantizing circuit 3. It is advantageous to use the most significant bits from the echo signal for addressing memory 4, since, as has already been described in the foregoing, no high quantization degree is required for cancelling the non-linear distortion, whilst such a high quantization degree would slow down the adaptive control. If the echo signal is formed, for example, by 16 bits, it is, for example, possible to utilize the four most significant bits 15-12 as an address for memory 4.

It is alternatively possible to connect the input terminal of quantization circuit 3 to the input of the A/D converter 2 instead of to its input.

For an adequate operation of the system of FIG. 2 it is furthermore also a requirement that the values in the Table are coupled in some way or another. An advantageous manner to realise this coupling is, as has already been described in the foregoing, cyclically adjusting adjacent Table values to each other, towards the origin. The cyclic procedure can, for example, be effected as follows: each time a correction value is read from the Table, one Table value is matched to the adjoining Table value taken in the direction of the origin. This match is effected for the Table values in the sequence in which they occur in the Table and, consequently, independent of the actual Table value read for compensating for non-linear distortion in the output signal of A/D converter 2. After each Table value has been corrected once, the correction can be stopped for a predetermined period of time and be resumed thereafter in the same way, or alternatively the first value in the Table can directly be corrected. This procedure assumes that each Table value is corrected cyclically. For a person skilled in the art it will be obvious that there are many other possibilities to correct the Table values such that given Table values having too low a frequency are prevented from being corrected and/or the Table values are prevented from providing a linear compensation, which indeed results in a linear characteristic but which characteristic has an incorrect angle of slope.

What is claimed is:

1. An arrangement for compensating for non-linear distortion in an input signal to be digitized, comprising an analogue-to-digital converter for converting the input signal into an amplitude-time discrete output signal, characterized in that there are provided means for deriving a set of coefficients associated with an orthogonal signal representation of a signal which is related to the input signal, a memory in which a Table of correction values can be stored, means for addressing the memory for reducing a correction value from the Table, each coefficient determining an address for the memory, means for summing the read correction values and the output signal of the analogue-to-digital converter for providing a linearized signal, and an adaptive control loop having means for determining a linear approximation of the input signal, means arranged for determining the difference between the linearized signal and the signal which is a representation of the linear approximation of the input signal, means for determining a new correction value from this difference and the correction value read, and means for substituting in the Table the new correction value for the correction value read.

2. An arrangement as claimed in claim 1, characterized in that the set of coefficients is determined by quantizing a signal which is related to the input signal.

3. An arrangement as claimed in claim 2, characterized in that the signal which is related to the input signal is the output signal of the analogue-to-digital converter.

4. An arrangement as claimed in at least one of the claims 1-3, characterized in that means are provided for cyclically correcting the correction values in the Table, the $2N+1$ correction values $C_i(i=-N$ to $N)$ in the Table being corrected in accordance with:

$$C_i = C_i + K_s(C_{i-1} - C_i) \text{ for } i=1 \text{ to } N$$

$$C_i = C_i + K_s(C_{i+1} - C_i) \text{ for } i=-1 \text{ to } -N$$

$$C_0 = C_0 + K_s C_0,$$

wherein $K_s$ is a smoothing constant.

5. An arrangement as claimed in claim 4, characterized in that during a predetermined period always when a correction value has been read from the Table, one correction value is corrected, correcting the correction value being effected, during reading of any random correction values, and in the sequence in which the correction values are present in the Table.

6. An echo cancellation system for a transceiver system, comprising a transmitting arangement and a receiving arrangement which are coupled to a hybrid circuit for enabling digital transmission via a two-wire line, the receiver arrangement being coupled to the hybrid coupling circuit via an analogue-to-digital converter, the echo cancellation system including an echo canceller for reducing the signal received via the hybrid circuit and the analogue-to-digital converter by an estimated value of the echo component present in that signal in response to the signal from the transmitter arrangement, characterized in that there are provided an arrangement for compensating for non-linear distortion in the received signal, the arrangement being coupled between the analogue-to-digital converter and the receiver arrangement and providing means for deriving a set of coefficients associated with an orthogonal signal representation of a signal which is related to the received signal in a memory in which a Table containing correction values can be stored, means for addressing the memory for reading a correction value from the Table, each coefficient determining an address for the memory, means for summing the correction value read and the analogue-to-digital converter output signal for providing a linearized signal, an adaptive control loop including means for determining a linear approximation of the received signal, means arranged for determining the difference between the linearized signal and the signal which is a representation of the linear approximation of the received signal, means for determining a new correction value from this difference and the correction value read and means for substituting in the Table the new correction value for the correction value read.

7. An echo cancellation system as claimed in claim 6, characterized in that the set of coefficients is determined by quantizing a signal related to the input signal.

8. An echo cancellation system as claimed in claim 7, characterized in that the signal related to the input signal is the echo canceller output signal.

9. An echo cancellation system as claimed in claim 6, characterized in that the signal related to the input signal is the echo canceller output signal.

10. An echo cancellation system as claimed in claim 9, characterized in that the set of coefficients of the echo canceller output signal is formed by the most significant bits of that signal.

11. An echo cancellation system as claimed in at least one of the claims 6 to 10, characterized in that there are provided means for cyclically correcting the correction values in the Table, the $2N+11$ correction values $C_i(i=-N$ to $N)$ in the Table being corrected in accordance with:

$$C_i = C_i + K_s(C_{i-1} - C_i) \text{ for } i=1 \text{ to } N$$

$$C_i = C_i + K_s(C_{i+1} - C_i) \text{ for } i=-1 \text{ to } -N$$

$$C_0 = C_0 - K_s C_0,$$

wherein $K_s$ is a smoothing constant.

12. An echo cancellation system as claimed in claim 11, characterized in that during a predetermined period, always when a correction value has been read from the Table, one correction value is corrected, correcting the correction values being effected on reading any random correction value, in the sequence in which the correction values occur in the Table.

* * * * *

UNITED STATES PATENT AND TRADEMARK OFFICE
CERTIFICATE OF CORRECTION

PATENT NO. : 4,746,902

DATED : May 24, 1988

INVENTOR(S) : Simon J. M. Tol and Kornelis J. Wouda

It is certified that error appears in the above-identified patent and that said Letters Patent is hereby corrected as shown below:

On the Cover page at [73], "AT&T, Berkeley Heights, N. J.; Philips Telecommunications B. V., Hilversum, Netherlands" should read --AT&T and Philips Telecommunications B. V., Hilversum, The Netherlands--.

Signed and Sealed this

Thirteenth Day of December, 1988

Attest:

DONALD J. QUIGG

*Attesting Officer*  *Commissioner of Patents and Trademarks*